United States Patent [19]

Masuda

[11] Patent Number: 5,759,215
[45] Date of Patent: Jun. 2, 1998

[54] METHOD OF PREPARING ELECTROCHEMICAL CELLS

[76] Inventor: William Masuda, 17499 Blue Jay Dr., Morgan Hill, Calif. 92691

[21] Appl. No.: 559,120

[22] Filed: Nov. 17, 1995

[51] Int. Cl.$^6$ .................................................. H01M 6/18
[52] U.S. Cl. .......................... 29/623.2; 29/623.5; 429/192; 429/194; 429/218; 429/223; 429/224
[58] Field of Search .................................. 429/192, 194, 429/218, 223, 224; 29/623.1, 623.2, 623.5

[56] References Cited

U.S. PATENT DOCUMENTS

| 5,219,680 | 6/1993 | Fauteux | 429/192 |
| 5,456,000 | 10/1995 | Gozdz et al. | 29/623.2 |
| 5,460,904 | 10/1995 | Gozdz et al. | 429/162 |

*Primary Examiner*—M. Muzzolillo
*Attorney, Agent, or Firm*—Karen S. Perkins

[57] ABSTRACT

A method for activating the anode, cathode, and polymeric matrix components of an electrochemical cell is provided. Subsequent to forming the electrochemical cell precursor a quantity of activation fluid comprising electrolyte solvent and an inorganic salt is added into the electrochemical cell precursor at a rate such that substantially all of the activation fluid is incorporated into the electrochemical cell precursor. The method produces electrochemical cells having consistent amounts of solvent and salts therein.

20 Claims, 1 Drawing Sheet

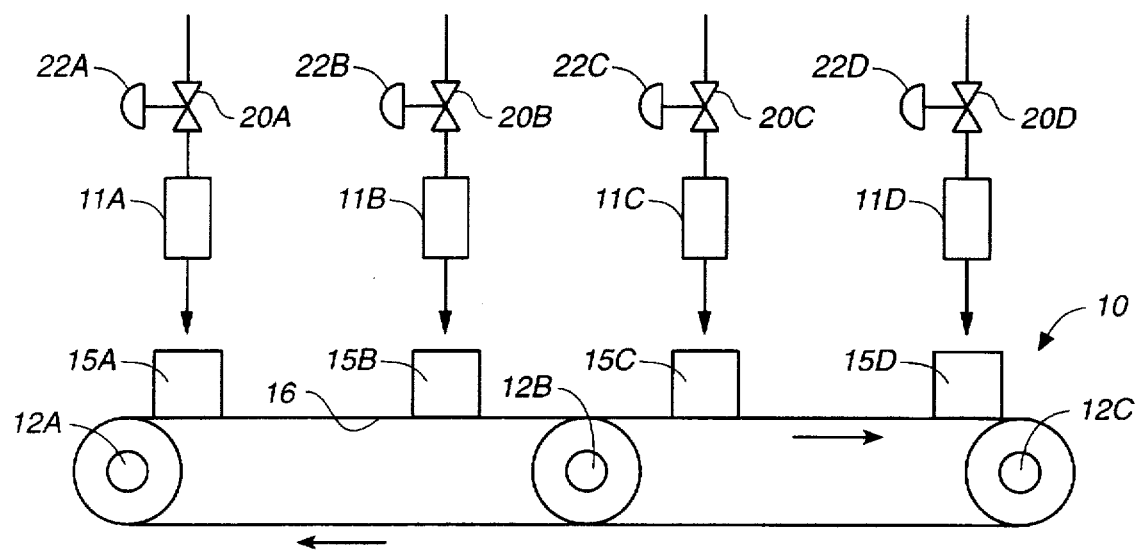
FIG._1

METHOD OF PREPARING ELECTROCHEMICAL CELLS

BACKGROUND OF THE INVENTION

1. Field of the Invention

This invention relates to fabricating solid electrochemical (electrolytic) cells and, more particularly, to a method of facilitating the addition of electrolytic solutions into an electrochemical cell (or precursor thereof) in order to activate the electrochemical cell.

2. State of the Art

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Various factors influence the performance of electrochemical cells. For instance, the morphology of the polymeric matrix and of the polymeric binders in the anode and/or cathode can affect conductivity of the salts. Enhancement of conductivity has been demonstrated by using porous polymeric matrices and polymeric binders. One method of producing such porous structures comprises forming polymeric structures in the presence of a plasticizer; upon removal of the plasticizer pores are created in the polymer and binder. The electrochemical cells are activated when electrolyte solvent and inorganic salt are added.

Prior art methods of introducing electrolyte solvent into the electrochemical cell include, for example, simply soaking or dipping the cell in an electrolyte solution. This process is inefficient and produces electrochemical cells having varying amounts of electrolyte solvent in the cells.

SUMMARY OF THE INVENTION

The invention is directed to an efficient method of activating electrochemical cells which can be adapted into batch, semi-continuous, and continuous processes. The method produces electrochemical cells having consistent amounts of electrolyte solution therein.

In one aspect, the invention is directed to a method of preparing an electrochemical cell comprising an anode, a cathode, and a polymeric layer interposed between the anode and cathode which comprises the steps of:

forming an anode composition comprising a carbon material, a first polymer, and a first plasticizer;

forming a cathode composition comprising a cathode active material, a second polymer, and a second plasticizer;

forming a polymeric matrix comprising a third polymer and a third plasticizer;

removing said first, second, and third plasticizers to form an electrochemical cell precursor; and adding a quantity of activation fluid into the electrochemical cell precursor at a rate such that substantially all of the activation fluid is incorporated into the electrochemical cell precursor.

In another aspect, the invention is directed to a method of activating an electrochemical cell precursor which comprises the steps of:

forming an electrochemical cell precursor; and adding a quantity of activation fluid into the electrochemical cell precursor at a rate such that substantially all of the activation fluid is incorporated into the electrochemical cell precursor.

The inventive method can be employed in a batch, semicontinuous, or continuous process.

BRIEF DESCRIPTION OF THE DRAWINGS

FIG. 1 is a schematic illustrating a system which employs the present invention.

DETAILED DESCRIPTION OF PREFERRED EMBODIMENTS

The present invention is directed to a method of dispensing activation fluids into electrochemical cells or precursors thereof. The activation fluids, which comprise electrolytic solvents and inorganic salts, are added at a rate which permits the fluids to be absorbed into the porous polymeric matrix and into the binder material of the anode and cathode without significant loss of the activation fluid. The result is that no activation fluid is wasted and the maximum amount of activation fluid can be added into the electrochemical cell at a minimum time. As further described below, the invention can be adapted for use in conjunction with a batch, semi-continuous or continuous process of activating electrochemical cells. Upon implementation, the inventive method will facilitate the rate at which the activation fluids are inserted into electrochemical cell precursors and eliminate any waste of activation fluids. The inventive method is particularly suited for activating electrochemical cells that comprise porous polymeric matrixes and porous polymeric binders that are formed upon removal of plasticizers therefrom.

Preferred cells include: a cathode comprising an active material, an intercalation based carbon anode, with each electrode capable of reversibly incorporating (i.e., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 µm to about 250 µm in thickness, preferably about 110 µm to about 200 µm, and more preferably about 125 µm to about 175 µm Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

The anode and cathode each also includes a current collector that comprises, for example, a screen, grid, expanded metal, woven or non-woven fabric or knitted wire formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by liquid solvents (e.g. diethyl ether) or dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector.

The term "activation" refers to the placement of an inorganic salt and electrolyte solvent into the porous portion of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation) of $\alpha MnO_2$ can be accomplished via a solid state reaction:

$NH_4Mn_8O_{16}+LiOH \rightarrow LiMnO_2$ (400° C.).

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form, under pressure, a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method is particularly suited for fabricating electrochemical cells having porous anode, cathode, and/or polymeric matrix structures.

Examples 1 and 2 describe methods of preparing an anode and cathode, respectively. Example 3 describes the procedures for assembling a solid electrochemical cell.

EXAMPLE 1

The anode current collector employed was a sheet of expanded copper metal that is about 50 μm thick. It is available under the designation 2Cu5-125 (flatten) from Delker, in Branford, Conn.

The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, in Branford, Conn.

The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMn_2O_4$ (spinel) ($0 \leq x < 2$) and $Li_y\text{-}\alpha\text{-}MnO_2$ ($0 \leq y < 1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating phyico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that the polymer or copolymer has a narrow molecular weight range.

$$\text{Preferably} \frac{M_n}{M_w} \cong 1.0.$$

Next, the dibutyl phthalate plasticizer is extracted from the precursor before being activated by the inventive method described below. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide.

An exemplary system for carrying out the activation process of the present invention is shown diagrammatically in FIG. 1. The system is preferably located inside a controlled environment such as inside a chamber having an inert (e.g., argon) atmosphere. The system includes a conveyor 10 having wheels 12A, 12B, and 12C that moves conveyor belt 16. Situated above the conveyor are electrolyte solution dispensing units 11A, 11B, 11C, and 11D. The dispensers are connected to a source of electrolyte solution that comprises an electrolyte solvent and inorganic salt. The flow of electrolyte solution through the dispensing units is regulated by controls 22A, 22B, 22C, and 22D which actuates valves 20A, 20B, 20C, and 20D, respectively. In this fashion, the flowrates through the four dispensing units can be controlled by a computer (not shown).

The belt can support a plurality of electrochemical cell or battery precursors which require activation. In this example, 4 electrochemical cell precursors 15A, 15B, 15C, and 15D are positioned and spaced apart on the belt so that each cell can be positioned below a dispenser as shown. As is apparent, the system can be designed to handle one or more electrochemical cell precursors on a batch, semi-continuous, or continuous (e.g., assembly line) basis. The number of dispensing units and corresponding electrochemical cell precursors that they activate are not critical.

In a preferred embodiment, each electrochemical cell or battery precursor will have been pre-packaged in a moisture-impermeable material, which is described, for example, in U.S. Pat. No. 5,326,653, which is incorporated herein, prior to the activation process. Each package has an aperture through which the electrolyte solution is introduced. After the package has been initially filled to capacity, the electrolyte solution will be absorbed into the porous portions of the polymeric matrix and binder materials of the anode and cathode. The absorption will cause the level of the electrolyte solution in the package to recede; additional electrolyte solution is then introduced into the package. This processing of allowing the electrolyte solution to be absorbed and thereafter refilling continues until the porous portions of the precursor are fully saturated with solution and the desired volume of electrolyte solution inside the packaged is achieved. The aperture is then sealed and the electrochemical cell or battery is ready for use.

This system of FIG. 1 can be employed to so that each dispenser supplies a different amount of electrolyte solution with dispenser 11A supplying the largest amount and dispenser 11D the least. In this fashion, an electrochemical cell precursor when reaching a position under dispenser 11A would be filled with a first amount of electrolyte solution which should be enough to fill the precursor without any overflow. Next, after the electrolyte solution has been absorbed into the precursor and has moved to a position under dispenser 11B, the precsursor is again filled with a predetermined amount of electrolyte solution. This process continues through dispenser 11D which supplies the remaining amount of electrolyte solution which would fully fill (i.e., saturate) the precursor without any spillage.

The system can also be employed so that each dispenser can be regulated to introduce a varying amount of electrolyte solution. In this fashion, a single dispenser can be used to completely fill an electrochemical cell precursor positioned underneath it. For instance, each dispenser can be regulated to introduce electrolyte solution, either in a step-wise or continuously fashion, into the electrochemical cell precursor at a decreasing rate such that there is sufficient time from the start of introduction to the end for the electrolyte solution to absorb into the precursor without causing the solution to overflow.

As is apparent, the flow rate and the amount of electrolyte solution dispensed will depend on the configuration, size, and composition of the precursor. For instance, the porosity of the polymeric matrix layer and of the binder material of the anode and cathode are important factors. For continuous systems in particular, the flow rate, absorption rate of electrolyte solution into the precursor, and total amount of electrolyte solution required as well as other parameters, are calculated on a batch scale with individual electrochemical cell precursors before the system is employed on a production scale.

The inventive process is expected to facilitate the fabrication of electrochemical cells and batteries with each having substantially the same amount of electrolyte solution introduced therein. This precision also is achieved without significant waste of electrolyte solution.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method of activating an electrochemical cell precursor package which comprises the steps of:
   (a) forming an electrochemical cell precursor package, said electrochemical cell precursor package including a moisture-impervious material having a sealable aperture therethrough, said material containing a porous structure comprising:
      (i) an anode
      (ii) a cathode; and
      (iii) a polymeric matrix interposed between said anode and said cathode; and
   (b) adding a quantity of activation fluid through said sealable aperture of the electrochemical cell precursor package at a rate such that substantially all of the activation fluid is incorporated into the porous structure.

2. The method of claim 1 wherein the activation fluid is added in a step-wise fashion such that measured quantities of said activation fluid is added until the electrochemical cell precursor is filled.

3. The method of claim 1 wherein the activation fluid is added in continuously diminishing volume into the electrochemical cell precursor package.

4. The method of claim 1 wherein adding the activation fluid comprises the steps of:
   (i) introducing a part of the activation fluid into the electrochemical cell precursor package;
   (ii) allowing the activation fluid to permeate into the porous structure of the electrochemical cell package;
   (iii) adding an additional quantity of activation fluid into the electrochemical cell precursor package; and
   (iv) repeating steps (ii) and (iii) until the porous structure is saturated.

5. The method of claim 1 wherein the activation fluid comprises an electrolyte solvent and inorganic salt.

6. A method of preparing an electrochemical cell, said method comprising the steps of:
   forming an anode composition comprising a carbon material, a first polymer, and a first plasticizer;
   forming a cathode composition comprising a cathode active material, a second polymer, and a second plasticizer;
   forming a polymeric matrix comprising a third polymer and a third plasticizer;
   removing said first, second, and third plasticizers to form a porous structure having an anode, a cathode, and a polymeric matrix interposed therebetween;
   placing the porous structure into a package having a sealable aperture therethrough; and
   adding a quantity of activation fluid through the aperture at a rate such that substantially all of the activation fluid is incorporated into the porous structure prior to sealing of the aperture.

7. The method of claim 6 wherein the activation fluid is added in a step-wise fashion such that measured quantities of said activation fluid is added until the electrochemical cell precursor is filled.

8. The method of claim 6 wherein the activation fluid is added continuously into the electrochemical cell precursor.

9. The method of claim 6 wherein adding the activation fluid comprises the steps of:
   (i) introducing activation fluid into the package;
   (ii) allowing the activation fluid to permeate into the porous structure;
   (iii) adding an additional quantity of activation fluid into the package; and
   (iv) continuing steps (ii) and (iii) until the porous structure is saturated.

10. The method of claim 6 wherein the first, second, and third plasticizers comprise dibutyl phthalate.

11. The method of claim 6 wherein the cathode active material is selected from the group consisting of lithiated manganese oxides, lithiated cobalt oxide, lithiated nickel oxides, vanadium oxides and mixture thereof.

12. The method of claim 6 wherein said first, second, and third polymers comprise polyvinylidene difluoride.

13. The method of claim 1 further comprising the step of:
   (c) sealing said aperture of said package to enclose the porous structure and the substantially absorbed activation fluid within the package.

14. The method of claim 6 wherein the activation fluid comprises an electrolyte solvent and an inorganic salt.

15. The method of claim 6 further comprising the step of: sealing said aperture of said package to enclose the porous structure and the activation fluid within the package.

16. A method of preparing an electrochemical cell, said method comprising the steps of:
   (a) placing into a moisture-impermeable package a porous structure including:
      (i) an anode;
      (ii) a cathode;
      (iii) a polymeric matrix interposed between said anode and said cathode;
   (b) introducing activation fluid into the package at a rate such that substantially all of the activation fluid is incorporated into the porous structure prior to sealing of the package; and
   (c) sealing the package.

17. The method of claim 16 wherein the activation fluid is added in a step-wise fashion such that measured quantities of said activation fluid is added until the porous structure is saturated.

18. The method of claim 16 wherein the activation fluid is added in continuously diminishing volume until the porous structure is saturated.

19. The method of claim 16 wherein the step of introducing activation fluid further comprises the steps of:
   (i) introducing a part of the activation fluid into the package;
   (ii) allowing the activation fluid to permeate into the porous structure within the package;
   (iii) adding an additional quantity of activation fluid to the package; and
   (iv) repeating steps (ii) and (iii) until the porous structure is saturated.

20. The method of claim 16 wherein the activation fluid comprises an electrolyte solvent and an inorganic salt.

* * * * *